United States Patent [19]

Hassner et al.

[11] Patent Number: 5,594,436
[45] Date of Patent: Jan. 14, 1997

[54] SIGNAL PROCESSING CHANNEL WITH HIGH DATA RATE AND LOW POWER CONSUMPTION

[75] Inventors: Martin A. Hassner, Palo Alto, Calif.; Uwe Schwiegelshohn, Dortmund Kirchhoerde, Germany; Shmuel Winograd, Scarsdale, N.Y.

[73] Assignee: International Business Machines Corporation, Armonk, N.Y.

[21] Appl. No.: 327,062

[22] Filed: Oct. 21, 1994

[51] Int. Cl.$^6$ .................................................. H03M 7/00
[52] U.S. Cl. ............................. 341/59; 341/95; 341/132
[58] Field of Search ............................... 341/59, 95, 106, 341/132, 166

[56] References Cited

U.S. PATENT DOCUMENTS 3,662,377  5/1972  Dym et al. ........................ 341/166
3,882,489  5/1975  Guggolz ........................... 341/132
4,768,019  8/1988  Linder ............................. 341/166
4,945,538  7/1990  Patel .............................. 371/43

FOREIGN PATENT DOCUMENTS

0463752A2  1/1992  European Pat. Off. ......... G06F 7/04

Primary Examiner—Todd DeBoer
Attorney, Agent, or Firm—Henry E. Otto, Jr.

[57] ABSTRACT

An apparatus and method for detecting analog signals representing patterns of n-bit RLL-encoded data read from a data storage device. R integrators each integrate the analog signal over successive time periods consisting of a preselected number n of bit cycles, where n>1, weighted by a preselected set of n orthogonal signals that are staircase functions which vary each bit cycle to provide R integrated weighted outputs. The R integrated weighted outputs are converted by a lookup table or read-only memory into an n-bit digital representation corresponding to a unique one of the n-bit analog data patterns.

13 Claims, 5 Drawing Sheets

SIGNAL PROCESSING CHANNEL WITH HIGH DATA RATE AND LOW POWER CONSUMPTION

TECHNICAL FIELD

This invention relates to an apparatus and method for processing analog read signals in a channel for a disk drive, and more particularly to such a channel which enables detection of data at high data rates with minimal power consumption.

BACKGROUND OF THE INVENTION

Many computer applications, such as those involving interactive media and scientific computation, require reading of data at a data rate of about 5 MB/sec. While the technology permits some components of disk drives, such as read heads, to operate at data rates of 30 MB/sec., it is not currently possible for the electronic components of a read channel. Techniques heretofore proposed cannot be used for low-end applications, such as with personal computers or notebooks, which require low power consumption.

In a read channel, a read head (inductive or magnetoresistive) generates an analog signal from data stored in binary form on a disk. Each change in orientation of the binary data results in a peak in the analog signal. The electronic components of the read channel must reliably detect the peaks in the analog signal in order to reconstruct the binary data.

In a channel using peak detection, a peak is detected (1) if the signal changes its sign, (2) if it exceeds a threshold, and (3) if its derivative is zero. The peak detection approach provides an analog channel with low power consumption that is relatively inexpensive to manufacture but requires reliable detection at each peak. However, reliable detection cannot be guaranteed in high data rate applications where overlap of the signal response can occur between enabling peaks.

Published European Patent Application 0 463 752 A2 discloses a pattern-matching circuit which compares bit by bit a given multibit data lo pattern against templates of various multibit patterns and then outputs as the most likely multibit pattern that one which most closely matches the given pattern.

U.S. Pat. No. 4,945,538 discloses a signal processing channel which processes an analog read signal after it is converted by an analog-to-digital converter into digitized sample values.

No prior art of which applicants are aware discloses a signal processing channel in which a run-length-limited (RLL)-encoded analog read signal is integrated and weighted by a preselected set of staircase amplifier gain factors to provide a plurality of staggered analog signals, each of which is constant for an identical preselected period of time (such as a half-bit period) but offset timewise in equal increments for detecting multibit patterns instead of single bits.

SUMMARY OF THE INVENTION

An apparatus and method are described for enhancing peak detection of analog signals corresponding to patterns of n-bit RLL-encoded data read from a data storage device.

From peaks detected from said patterns, one clock signal is generated having a period consisting of n bit cycles, where n>1, and another clock signal is generated having a period equal to a fraction x of each bit cycle, where x≦1. R filters each comprise n amplifiers for weighting each analog signal with a different set of n/x amplification gains. Switch means render these weighted amplification gains active for successive series of n.x bit cycles, each series being offset timewise by x bit cycles. R integrators integrate the n timewise offset weighted amplification gains and respond to said one clock signal for providing R integrated weighted outputs every n bit cycles. These R integrated weighted outputs are converted by a lookup table (or ROM) into sequences of n-bit digital data representations of the n-bit RLL-encoded data.

Each of the R integrators preferably comprises a pair of capacitors alternately chargeable and dischargeable during successive n-bit cycle periods. Also, R quantizer units preferably each quantize the respective R integrated weighted outputs into a preselected number m of levels such that each n-bit RLL-encoded data pattern corresponds to a unique combination of R m-valued levels that are converted by the lookup table or ROM into an n-bit digital representation corresponding to a unique one of the n-bit RLL-encoded data patterns.

DESCRIPTION OF THE PREFERRED EMBODIMENT

Figure 1:
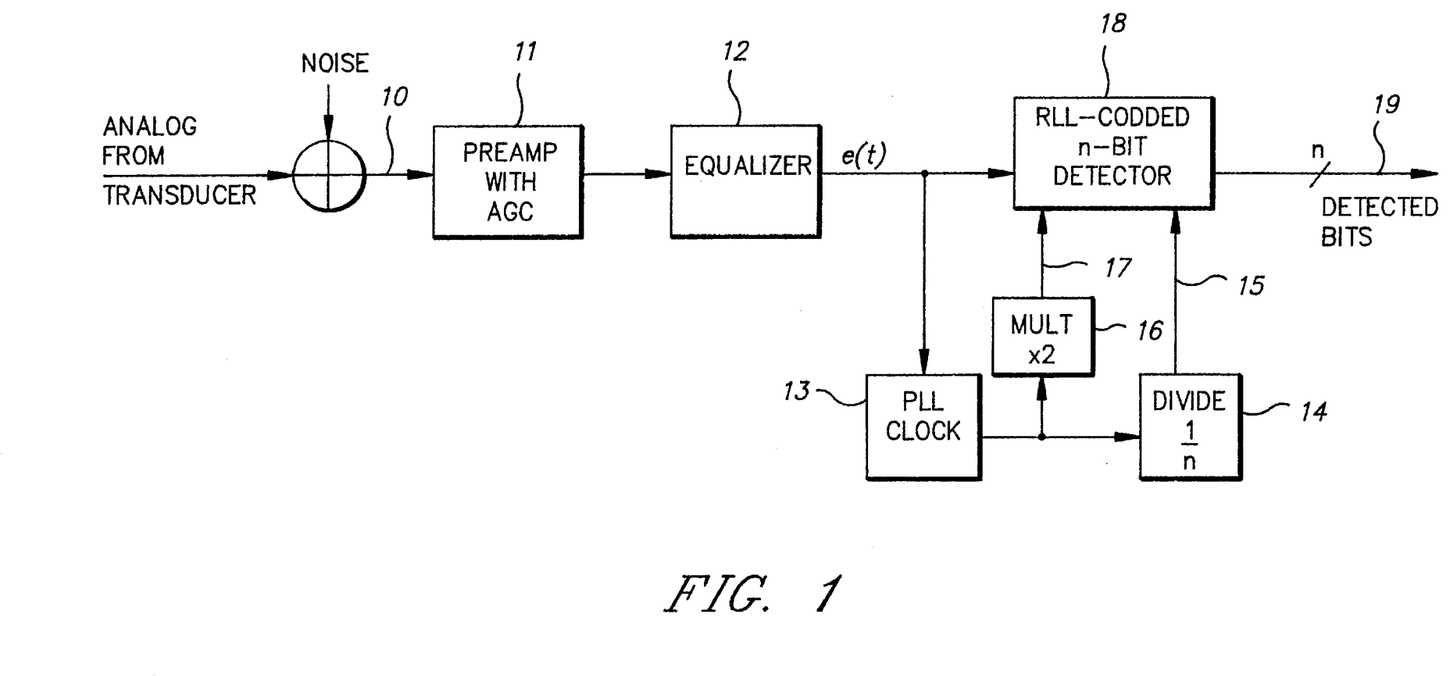
FIG. 1 is a schematic diagram of a coded signal processing channel embodying the invention.

As illustrated in FIG. 1, the signal processing channel embodying the invention comprises a line 10 via which an analog read signal, corrupted by noise, is received from a transducer, such as a magnetic or optical read head, in a digital storage device. This read signal corresponds to patterns of an n-bit RLL-encoded analog data sequence, which as illustrated is a binary data sequence encoded with the (1,7) RLL code during a write operation. The read signal is amplified by a preamplifier 11 with automatic gain control (AGC) and preferably equalized by an equalizer 12. The equalized signal et(t) from equalizer 12 is passed to a clock 13 that outputs a phase-locked clock signal each bit cycle. The apparatus, as thus far described, may be identical to that used in a conventional peak-detection channel with (1,7) code.

In the embodiment illustrated, it will be assumed that the data are encoded using a (1,7) RLL code and that a 6-bit pattern consists of two 3-bit code units. Due to the constraints of the (1,7) code, there are only 20 different allowable 6-bit patterns. These allowable patterns are set forth in Table 1 which, together with other tables, are contained in the attached APPENDIX which is made part hereof. For convenience, these allowable patterns are labeled with a two-letter identifier; e.g., AB.

According to the invention and as illustrated herein, the clock signals generated each bit cycle by clock 13 are passed to a clock signal divider 14 which outputs to line 15 a clock cycle having a period of six bit cycles. Clock 13 is also preferably, and as illustrated, connected to a clock signal multiplier 16 that outputs to line 17 a clock signal having a period of one half-bit cycle. Lines 15 and 17 apply 6-bit clock signals and half-bit clock signals to a RLL-encoded 6-bit detector 18 which provides a digital 6-bit output in bus 19 that, corresponds to the analog read signal sensed by the transducer (not shown).

Figure 2:
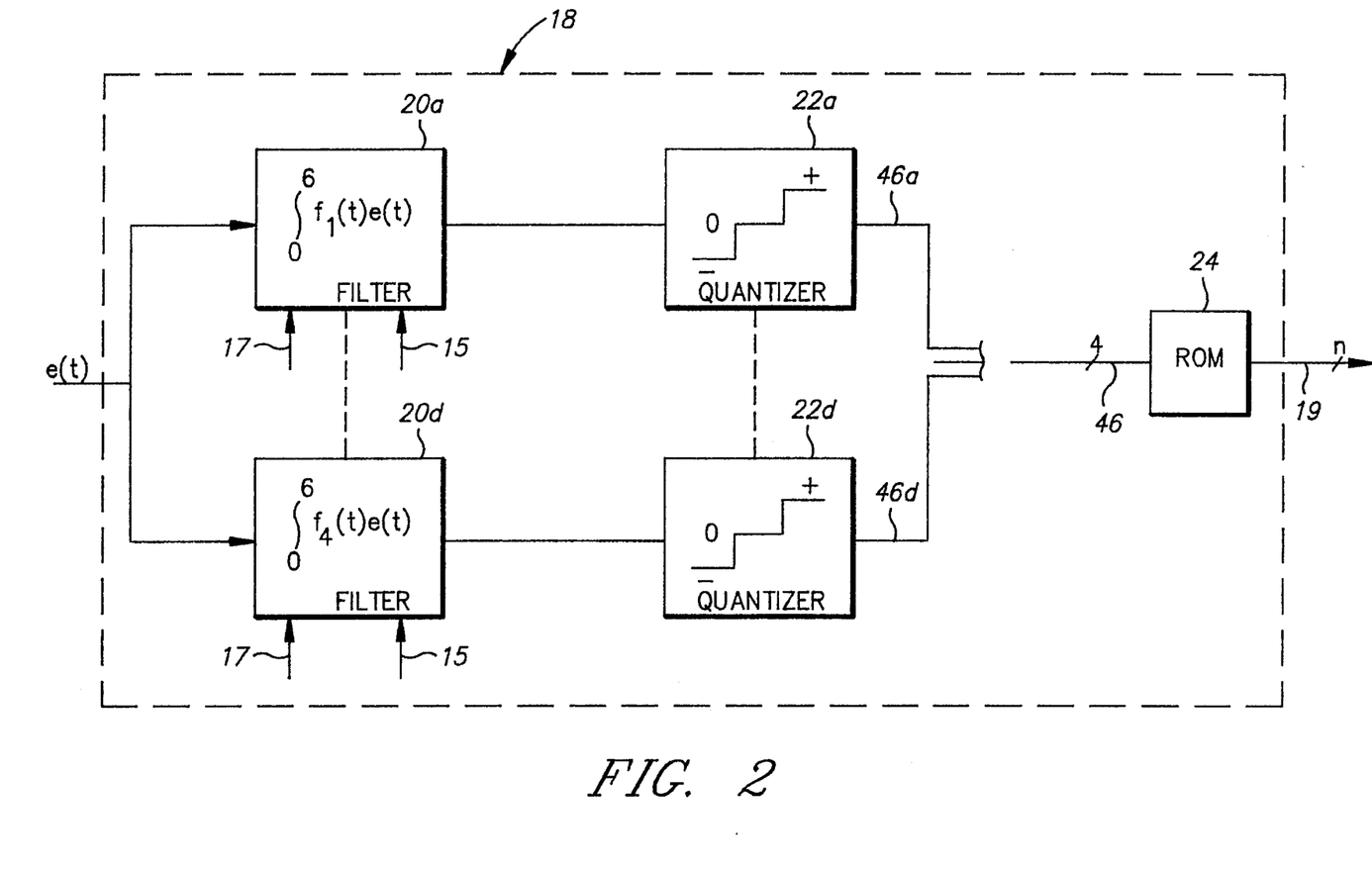
FIG. 2 is a schematic diagram depicting components of a RLL-encoded detector forming part of the channel of FIG. 1.

As illustrated in FIG. 2, detector 18 comprises four filter units 20a–d, and preferably four quantizing units 22a–d, and a lookup table or read-only memory (ROM) 24.

Figure 3:
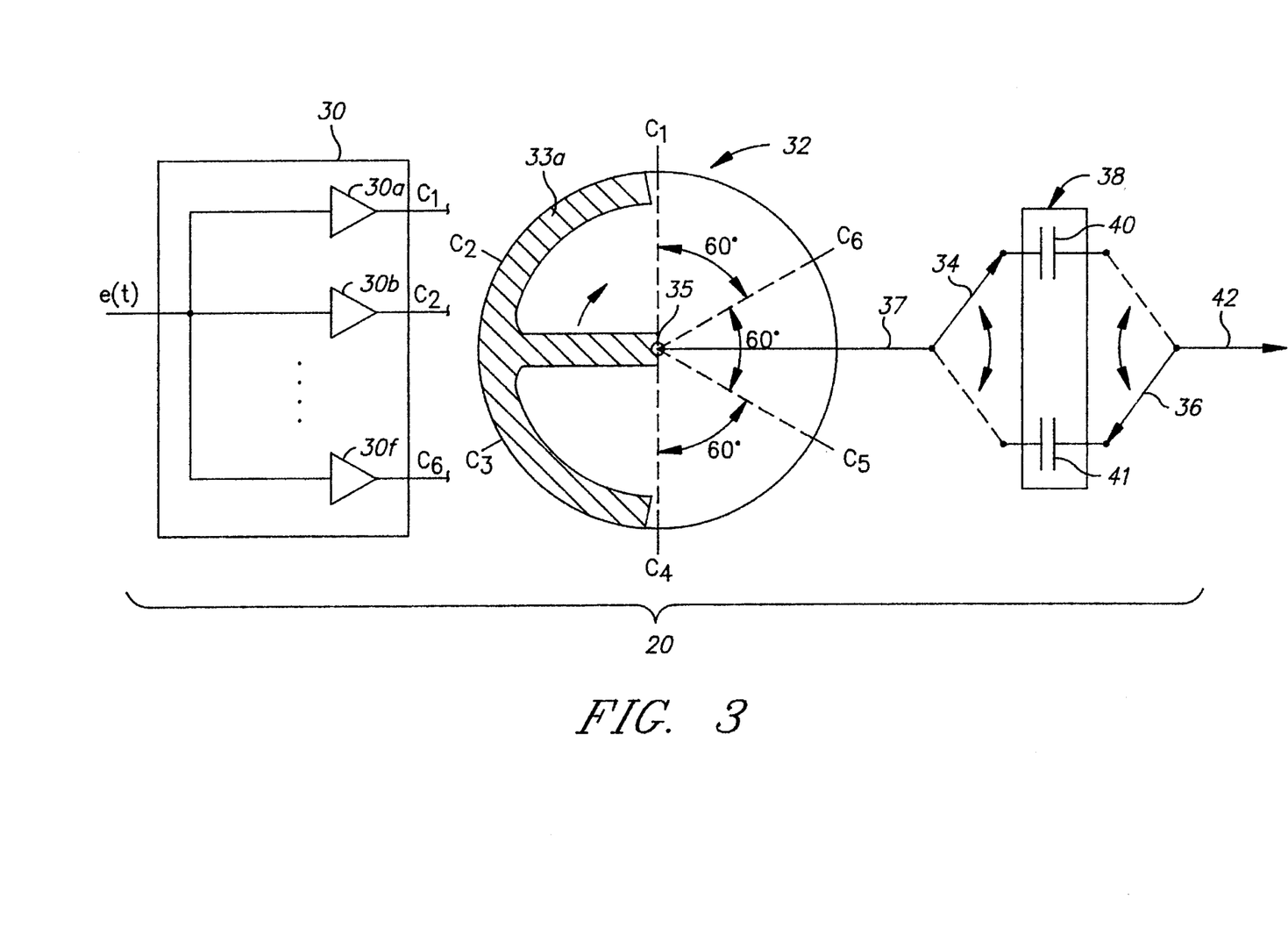
FIG. 3 is a schematic diagram showing details of a filter unit forming part of the detector depicted in FIG. 2.
Figure 4:
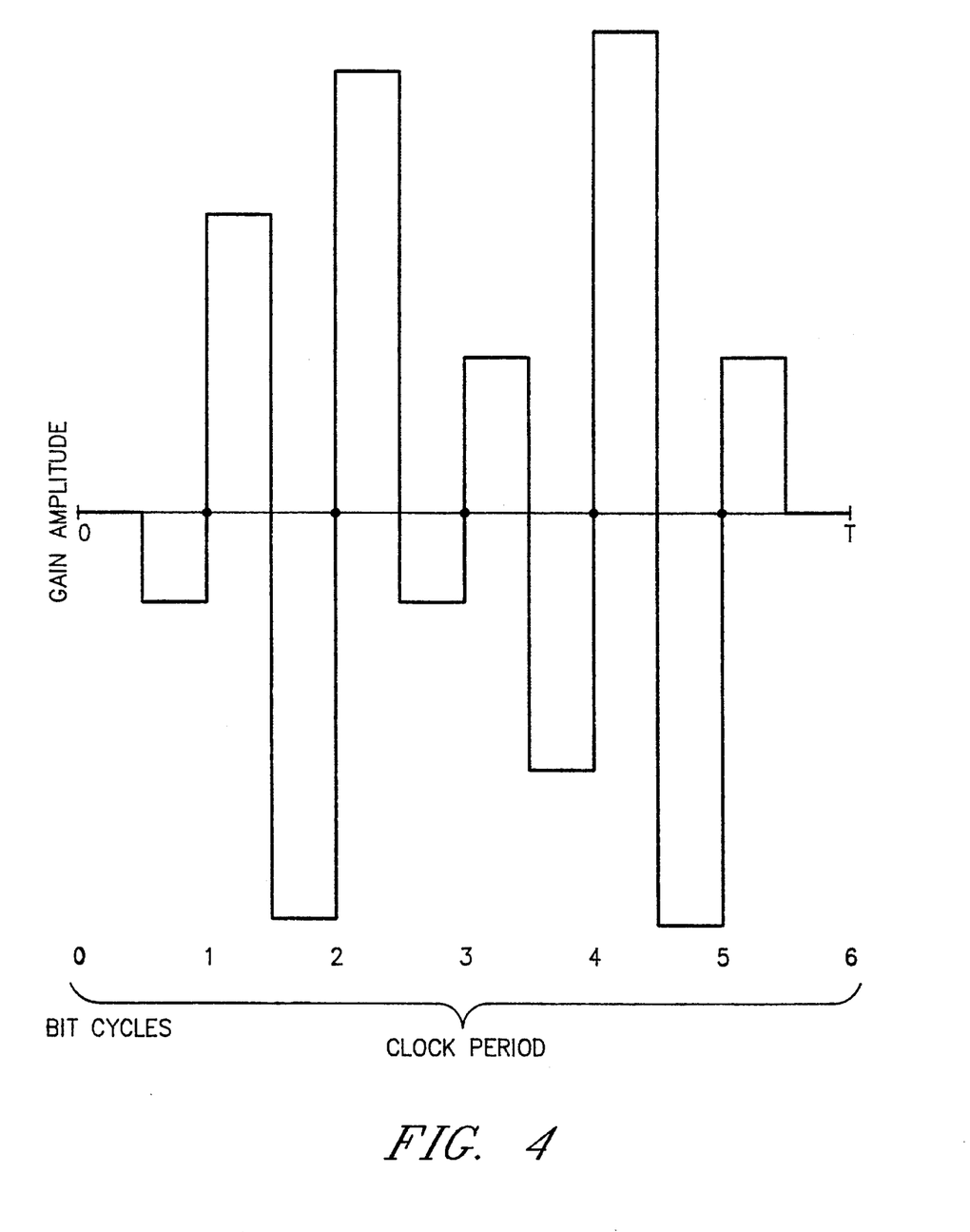
FIG. 4 shows the gain factors which are applied by one of the filter units to an analog read signal every half-bit clock cycle.

As illustrated in FIG. 3, each filter unit 20a–d comprises an amplifier unit 30, switches 32, 34, 36, and an integrator unit 38. Each amplifier unit 30 comprises six amplifiers 30a–f having six different gain factors $c_1, c_2, \ldots, c_6$. Signal e(t) is fed in parallel to these six amplifiers whose differing gain factors are active over different halves of the 6-bit clock period; that is, they are offset timewise in half-bit cycle increments, as depicted in FIG. 4. Thus, if the gain factor $c_1$ is active for the first three bit cycles (i.e., six half-bit cycles) of a 6-bit clock period, $c_2$ would be active at bit cycle 0.5 through cycle 3.0 (but not cycle 3.5), $c_3$ would be active at bit cycle 1.0 through cycle 3.5, etc. To accomplish this, for purposes of illustration, switch 32 may comprise a set of six substantially semicircular, axially-spaced contact arms 33a–f (only one of which, 33a, is shown) mounted on a common shaft 35. Each contact arm is offset rotationally 60 degrees from the adjacent contact arm and each contact arm is rotated clockwise 30 degrees every half-bit cycle in response to a clock signal from line 17 activating, for example, a pawl and ratchet drive (not shown) so as to apply its respective amplified voltage signal via shaft 35 to a common output line 37 throughout a different 3-bit cycle period. In practice, an electronic switch (not shown) which achieves the same offset gain factors as switch 32 may be preferred.

In each filter unit 20, shaft 35 is connected to switch 34 for selectively and alternately charging either a capacitor 40 or capacitor 41 in integrator unit 38 with the amplified and filtered sets of orthogonal signals that are output via line 37 as six weighted staircase functions. These staircase functions produce analog voltage signals that vary every one half-bit cycle and are integrated by the capacitors 40, 41. Switches 34 and 36 are actuated at the end of every 6-bit clock period in response to a clock signal from line 15 to cause switch 36 to connect the charged capacitor (40 as shown in FIG. 3) to a respective filter output line 42 and concurrently cause switch 34 to connect the previously discharged capacitor (41 as shown) to line 37 to permit charging thereof.

Table 2 sets forth the normalized coefficients of the filters 20a–d which are active during successive half-bit cycles of successive 6-bit periods. For example, the first filter $f_1(t)$ in Table 2 (20a in FIG. 2) provides, during each clock period of 6-bit cycles, gain amplitudes that vary as plotted in FIG. 4 for successive bit cycles.

Each filter unit 20 will produce for each of the 20 allowable (1,7) RLL-encoded 6-bit patterns one of five normalized values: $\{-2, -1, 0, 1, 2\}$. According to a feature of the invention, to reduce sensitivity to gain variations in the read signal, the values −2 and −1 and the values 1 and 2 preferably (though optionally) are combined to yield a − and a +, respectively; and the threshold for a − is established as −0.5 and for a + as +0.5. As a result, the range for the 0 value is only one quarter of the whole four-unit range, which provides significant tolerance to noise and jitter. It also reduces power consumption because switches 34, 36 operate only once every six bit cycles.

Thus, at the end of each 6-bit clock period, switches 34, 36 of each filter unit 20a–d are activated, one of the capacitors 40 or 41 in each respective integrator unit 38a–d is discharged, and their accumulated voltages are lo sampled by the quantizing units 22a–d, respectively. Table 3 sets forth the four outputs of the quantizing units 22a–d whose unique combinations of −, 0, and + correspond to one of the 20 allowable (1,7) RLL-encoded 6-bit data patterns. These four outputs 46a–d (FIG. 2) are transmitted as a 4-bit bus 46 to ROM 24. ROM 24 converts these outputs into a digital pattern as set forth in Table 4, corresponding to the unique one of the allowable (1,7) RLL-encoded 6-bit analog data patterns. These 6-bit digital patterns are transmitted via ROM 24 to bus 19 at the end of each 6-bit clock period as the output of the detector 18.

Figures 5, 6:
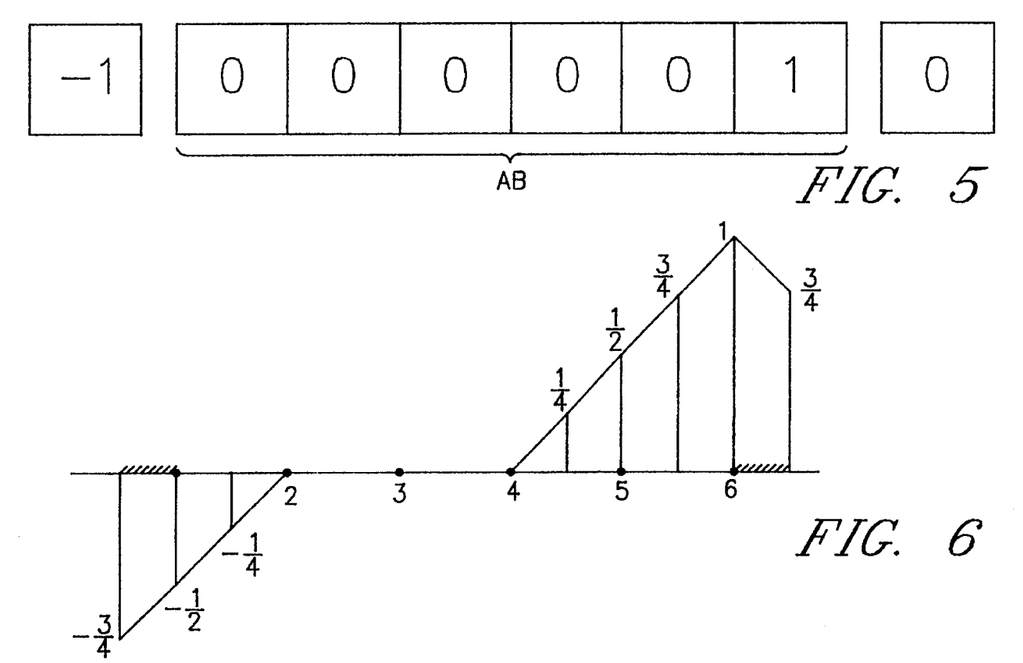
FIG. 5 depicts the bit pattern, including boundary conditions, for one of the 20 allowable (1,7) RLL-encoded 6-bit patterns.
FIG. 6 is a plot of analog signal amplitude v. time for successive half-bit slices of the bit pattern shown in FIG. 5.
Figure 7:
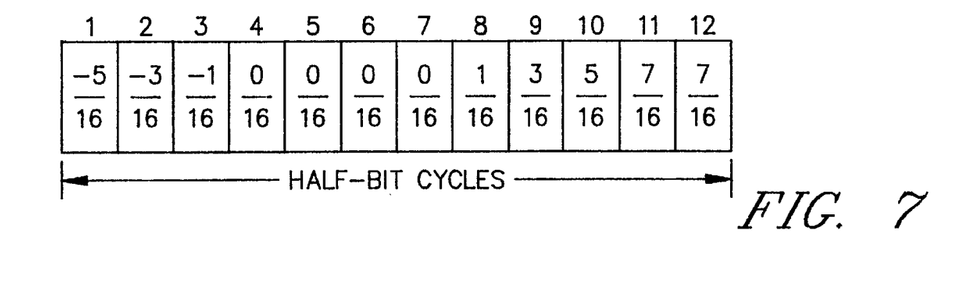
FIG. 7 shows the energy of each slice of the 12 half-bit slices of the 6-bit analog signal of FIG. 6.

FIGS. 5, 6, and 7 illustrate how an idealized pattern of the unique one of the allowable (1,7) 6-bit data patterns, designated AB, is integrated to provide the values shown in Table 3 as the four combined −, 0, and + outputs 46a–d of the quantizing units 22a–d.

More specifically, FIG. 5 shows the 6-bit (1,7)-encoded digital symbol for the data pattern AB. To the left of this data pattern is a boundary bit "−1" because there is a polarity change; and to the right of this data pattern is a boundary bit "0" because "1" is not allowable by the code. The boundary bits determine the intersymbol interference from adjacent 6-bit symbols.

FIG. 6 depicts the analog signal that corresponds to the symbol in FIG. 5, assuming a triangular readback pulse, which is practical analytical approximation to an actual readback pulse. The triangular shape allows very simple analytical computations from both the signal values as well as for the areas under the half-clock intervals. FIG. 7 lists the values of the areas of the triangular waveforms in FIG. 6 that correspond to the symbol (AB) in FIG. 5.

As illustrated, each unit area is considered as defined by a triangle having a height of ¼ unit and a base of ½, and hence an area of 1/16 square units. thus, in FIG. 7, all areas are expressed as integral multiples of a 1/16 unit area.

In similar fashion, it is possible to determine the area values for each of the remaining 19 (1,7)-admissible 6-bit symbols with all possible boundary conditions that determine the intersymbol interferences from adjacent symbols.

The above embodiments, as described, have been predicated on the assumption that the first peak is positive. If this is not true, then all data must be multiplied by −1. A polarity sensor (not shown) interposed in line e(t) at the input to detector 18 will sense the polarity for making any such adjustment.

As illustrated, the apparatus included the optional multiplier 16 to provide clock cycles at a predetermined fraction (herein assumed as ½) of a bit cycle. This is preferred to enhance detection accuracy in the event of jitter noise. However, if desired, multiplier 16 may be eliminated, in which case switch 32 would be incremented 60 degrees each bit cycle and there would be only six unit areas instead of the twelve depicted in FIGS. 6 and 7.

While a preferred embodiment of the present invention has been illustrated in detail, it should be apparent that modifications and improvements may be made to the invention without departing from the spirit and scope of the invention; and hence the invention should not be deemed limited except as proscribed by the claims.

TABLE 1

APPENDIX

All (1,7) RLL Allowable 6-bit Patterns

| | |
|---|---|
| [−5 −3 −1 0 0 0 0 1 3 5 7 7] | AB |
| [−5 −3 −1 0 0 1 3 5 7 6 2 −2] | AC |
| [−5 −3 −1 1 3 5 7 7 5 2 −2 −5] | AD |
| [−5 −3 −1 1 3 5 7 6 2 −2 −6 −7] | AE |
| [−5 −2 2 5 7 7 5 3 1 −1 −3 −5] | BA |
| [−5 −2 2 5 7 7 5 2 −2 −5 −7 −7] | BB |
| [−5 −2 2 5 7 6 2 −2 −6 −6 −2 2] | BC |
| [−2 2 6 7 5 3 1 0 0 −1 −3 −5] | CA |
| [−2 2 6 7 5 3 1 −1 −3 −5 −7 −7] | CB |
| [−2 2 6 7 5 2 −2 −5 −7 −6 −2 2] | CC |
| [−2 2 6 6 2 −2 −6 −7 −5 −3 −1 1] | CD |
| [−2 2 6 6 2 −2 −6 −6 −2 2 6 7] | CE |
| [7 7 5 3 1 0 0 0 0 0 0 −1] | DA |
| [7 7 5 3 1 0 0 −1 −3 −5 −7 −7] | DB |
| [7 7 5 3 1 −1 −3 −5 −7 −7 −5 −2] | DC |
| [7 7 5 2 −2 −5 −7 −7 −5 −3 −1 1] | DD |
| [7 7 5 2 −2 −5 −7 −6 −2 2 6 7] | DE |
| [7 6 2 −2 −6 −7 −5 −3 −1 0 0 1] | EA |
| [7 6 2 −2 −6 −7 −5 −2 2 5 7 7] | EB |
| [7 6 2 −2 −6 −6 −2 2 6 0 0 −1] | EC |

TABLE 2

Coefficients of Filters $f_1$–$f_4$ (20a–d) at Successive Half-bit Cycles of Successive 6-bit Periods

| | |
|---|---|
| $f_1$ | [0 −1.0 3.0 −4.2 4.6 −1.0 1.4 −2.6 4.6 −4.2 1.4 0] |
| $f_2$ | [0 −1.0 3.0 −4.15 3.0 −1.0 1.0 −3.0 4.15 −3.0 1.0 0] |
| $f_3$ | [0 −1.0 3.0 0.33 −2.34 1.66 1.66 −2.34 0.33 3.0 −1.0] |
| $f_4$ | [0 −1.0 3.0 −3.4 2.2 −0.2 1.4 −2.6 3.8 −1.8 0.6 0] |

TABLE 3

Outputs of Quantizing Units 24a–d

| | | | | |
|---|---|---|---|---|
| [0.0, 1.45, 6.65, 4.0] | = | [0, +, +, +] | = | AB |
| [0.0, 0.05, 13.25, 8.0] | = | [0, 0, +, +] | = | AC |
| [8.0, −1.4, 6.5, 8.0] | = | [+, −, +, +] | = | AD |
| [8.0, −2.85, −0.15, 4.0] | = | [+, −, 0, +] | = | AE |
| [16.0, 1.4, 6.5, 8.0] | = | [+, +, +, +] | = | BA |
| [16.0, −0.05, −0.15, 4.0] | = | [+, 0, 0, +] | = | BB |
| [16.0, 1.35, −6.75, 0.0] | = | [+, +, −, 0] | = | BC |
| [8.0, −0.05, 13.25, 4.0] | = | [+, 0, +, +] | = | CA |
| [8.0, −1.5, 6.6, 0.0] | = | [+, −, +, 0] | = | CB |
| [8.0, −0.1, 0.0, −4.0] | = | [+, 0, 0, −] | = | CC |
| [0.0, 1.35, 6.75, −4.0] | = | [0, +, +, −] | = | CD |
| [0.0, 2.8, 3.4, 0.0] | = | [0, +, +, 0] | = | CE |
| [0.0, −1.45, 6.65, 0.0] | = | [0, −, +, 0] | = | DA |
| [0.0, −2.9, 0.0, −4.0] | = | [0, −, 0, −] | = | DB |
| [0.0, −1.5, −6.6, −8.0] | = | [0, −, −, −] | = | DC |
| [−8.0, −0.05, 0.15, −8.0] | = | [−, 0, 0, −] | = | DD |
| [−8.0, 1.4, 6.8, −4.0] | = | [−, +, +, −] | = | DE |
| [−16.0, −2.85, 0.15, −8.0] | = | [−, −, 0, −] | = | EA |
| [−16.0, −1.4, 6.8, −4.0] | = | [−, −, +, −] | = | EB |
| [6.4, 13.2, −2.6, 9.6] | = | [+, +, −, +] | = | EC |

TABLE 4

ROM 24 Conversion Table

| 1 2 3 4 | | | | |
|---|---|---|---|---|
| [0, +, +, +] | <⇒ | AB | = | [0, 0, 0, 0, 0, 1] |

TABLE 4-continued

ROM 24 Conversion Table

| | | | | |
|---|---|---|---|---|
| [0, 0, +, +] | <⇒ | AC | = | [0, 0, 0, 0, 1, 0] |
| [+, −, +, +] | <⇒ | AD | = | [0, 0, 0, 1, 0, 0] |
| [+, −, 0, +] | <⇒ | AE | = | [0, 0, 0, 1, 0, 1] |
| [+, +, +, +] | <⇒ | BA | = | [0, 0, 1, 0, 0, 0] |
| [+, 0, 0, +] | <⇒ | BB | = | [0, 0, 1, 0, 0, 1] |
| [+, +, −, 0] | <⇒ | BC | = | [0, 0, 1, 0, 1, 0] |
| [+, 0, +, +] | <⇒ | CA | = | [0, 1, 0, 0, 0, 0] |
| [+, −, +, 0] | <⇒ | CB | = | [0, 1, 0, 0, 0, 1] |
| [+, 0, 0, −] | <⇒ | CC | = | [0, 1, 0, 0, 1, 0] |
| [0, +, +, −] | <⇒ | CD | = | [0, 1, 0, 1, 0, 0] |
| [0, +, +, 0] | <⇒ | CE | = | [0, 1, 0, 1, 0, 1] |
| [0, −, +, 0] | <⇒ | DA | = | [1, 0, 0, 0, 0, 0] |
| [0, −, 0, −] | <⇒ | DB | = | [1, 0, 0, 0, 0, 1] |
| [0, −, −, −] | <⇒ | DC | = | [1, 0, 0, 0, 1, 0] |
| [−, 0, 0, −] | <⇒ | DD | = | [1, 0, 0, 1, 0, 0] |
| [−, +, +, −] | <⇒ | DE | = | [1, 0, 0, 1, 0, 1] |
| [−, −, 0, −] | <⇒ | EA | = | [1, 0, 1, 0, 0, 0] |
| [−, −, +, −] | <⇒ | EB | = | [1, 0, 1, 0, 0, 1] |
| [+, +, −, +] | <⇒ | EC | = | [1, 0, 1, 0, 1, 0] |

What is claimed is:

1. A method of enhancing peak detection of analog signals corresponding to patterns of n-bit RLL-encoded data read from a data storage device, comprising the steps of:

from peaks detected from said patterns, generating clock signals having a period consisting of n bit cycles, where n>1;

integrating the analog signal weighted by R sets of n preselected orthogonal staircase gain factors, each of which is active over a different set of n bit cycles to provide R integrated weighted outputs; and every n-bit cycle, converting said R integrated weighted outputs into n-bit digital data patterns that correspond to the patterns of the n-bit RLL-encoded data.

2. The method of claim 1, including the step of quantizing the R integrated weighted outputs into a preselected number m of levels such that each n-bit data pattern corresponds to a unique combination of R m-valued levels, and wherein the converting step is implemented using a lookup table to identify from each such combination of R m-valued levels an n-bit digital data pattern corresponding to a unique one of the n-bit RLL-encoded data patterns.

3. A method of enhancing peak detection of analog signals corresponding to patterns of n-bit RLL-encoded data read from a data storage device, comprising the steps of:

from peaks detected from said patterns, generating clock signals having a period consisting of n bit cycles, where n>1, and also clock signals having a period constituting a predetermined fraction x of one bit cycle;

integrating the analog signal weighted by R sets of n preselected orthogonal staircase gain factors, each of which is active over a different set of n.x bit cycles to provide R integrated weighted outputs; and every n-bit cycle, converting said R integrated weighted outputs into n-bit digital data patterns that correspond to the patterns of the n-bit RLL-encoded data.

4. The method of claim 3, including the step of quantizing the R integrated weighted outputs into a preselected number m of levels such that each n-bit data pattern corresponds to a unique combination of R m-valued levels, and wherein the converting step is implemented using a lookup table to identify from each such combination of R m-valued levels an n-bit digital data pattern corresponding to a unique one of the n-bit RLL-encoded data patterns.

5. The method of claim 3 wherein n=6, x=½, R=4, and m=3.

6. An apparatus for detecting analog signals representing patterns of n-bit RLL-encoded data read from a data storage device, comprising:

R integrators, each for integrating the analog signal over successive time periods consisting of a preselected number n of bit cycles, where n>1, weighted by a preselected set of n orthogonal signals that are staircase functions which vary each bit cycle to provide R integrated weighted outputs; and means for converting said R integrated weighted outputs into a digital representation corresponding to a unique one of the n-bit analog data patterns.

7. An apparatus for detecting analog signals representing patterns of n-bit RLL-encoded data read from a data storage device, comprising:

R integrators, each for integrating the analog signal over successive time periods consisting of a preselected number n of bit cycles, where n>1, weighted by a preselected set of n orthogonal signals that are staircase functions which vary at a predetermined fraction x of each bit cycle to provide R integrated weighted outputs, each active over a different group of n.x bit cycles; and R quantizer units for quantizing the respective R integrated weighted outputs into a preselected number m of levels such that each n-bit data pattern corresponds to a unique combination of R m-valued levels; and means for converting each such combination into an n-bit digital representation corresponding to a unique one of the n-bit RLL-encoded data patterns.

8. The apparatus of claim 7, wherein n=6, x=½, R=4, and m=3.

9. An apparatus for enhancing peak detection of analog signals corresponding to patterns of n-bit RLL-encoded data read from a data storage device, comprising:

means for generating, from peaks detected from said patterns, one clock signal having a period consisting of n bit cycles, where n>1, and another clock signal having a period equal to a fraction x of each bit cycle where $x \leq 1$;

R filters, each including (i) n amplifiers for weighting each analog signal with a different set of n/x amplification gains, (ii) switch means for rendering said weighted amplification gains active for successive series of n.x bit cycles, each series offset timewise by x bit cycles, and (iii) R integrators for integrating the n timewise offset weighted amplification gains and responsive to said one clock signal for providing R integrated weighted outputs every n bit cycles; and means for converting the R integrated weighted outputs into sequences of n-bit digital data representations of the n-bit RLL-encoded data.

10. The apparatus of claim 9, wherein each of said R integrators comprises a pair of capacitors alternately chargeable and dischargeable during successive n-bit cycle periods.

11. The apparatus of claim 9, including:

R quantizer units, each interposed between one of said R integrators and said means for converting, for quantizing the respective R integrated weighted outputs into a preselected number m of levels such that each n-bit data pattern corresponds to a unique combination of R m-valued levels; and wherein said means for converting comprises a memory that converts each such combination into an n-bit digital representation corresponding to a unique one of the n-bit RLL-encoded data patterns.

12. The apparatus of claim 11, wherein the RLL-encoded n-bit data patterns have five normalized values: [−2, −1, 0, 1, 2] and there are three m levels wherein −z to +z is considered a 0 and values below −z and above +z are considered as a − and a +, respectively, to reduce sensitivity to gain variations in the analog signals.

13. The apparatus of claim 11, wherein each integrator comprises two capacitors, and switch means for alternately permitting charging one of the capacitors of each integrator while the other capacitor is discharging to a respective quantizing unit to generate a corresponding combination of the R m-valued levels.

* * * * *

UNITED STATES PATENT AND TRADEMARK OFFICE
CERTIFICATE OF CORRECTION

PATENT NO. : 5,594,436
DATED : 1/14/97
INVENTOR(S) : Martin A. Hassner, Uwe Schwiegelshohn, Dortmund Kirchhoerde and Shmuel Winograd It is certified that error appears in the above-indentified patent and that said Letters Patent is hereby corrected as shown below:

Column 7, line 13, change "n.x" to --n·x--.

Column 7, line 14, insert a paragraph break after "outputs; and".

Column 7, line 50, change "n.x" to --n·x--.

Column 8, line 18, change "n.x" to --n·x--.

Signed and Sealed this

Seventeenth Day of June, 1997

Attest:

BRUCE LEHMAN

Attesting Officer    Commissioner of Patents and Trademarks